United States Patent
Yairi

(10) Patent No.: US 9,727,571 B2
(45) Date of Patent: Aug. 8, 2017

(54) STORAGE SYSTEM SUPPORTING REPLACEMENT OF CONTENT IN A STORAGE DEVICE

(75) Inventor: Rahav Yairi, Oranit (IL)

(73) Assignee: SANDISK IL LTD., Kfar Saba (IL)

(*) Notice: Subject to any disclaimer, the term of this patent is extended or adjusted under 35 U.S.C. 154(b) by 1014 days.

(21) Appl. No.: 12/691,371

(22) Filed: Jan. 21, 2010

(65) Prior Publication Data

US 2011/0179143 A1    Jul. 21, 2011

(51) Int. Cl.
*G06F 15/16* (2006.01)
*G06F 15/167* (2006.01)
*G06F 13/00* (2006.01)
*G06F 17/30* (2006.01)

(52) U.S. Cl.
CPC .............................. *G06F 17/30144* (2013.01)

(58) Field of Classification Search
USPC ................................................... 709/217–221
See application file for complete search history.

(56) References Cited

U.S. PATENT DOCUMENTS

| | | | |
|---|---|---|---|
| 6,546,555 B1 | 4/2003 | Hjelsvold et al. | |
| 7,200,626 B1* | 4/2007 | Hoang et al. | |
| 7,277,870 B2 | 10/2007 | Mourad et al. | |
| 8,150,736 B2* | 4/2012 | Horn et al. | 705/26.1 |
| 2002/0120510 A1 | 8/2002 | Kawakami | |
| 2002/0152229 A1* | 10/2002 | Peng | 707/203 |
| 2002/0178178 A1* | 11/2002 | Peng | 707/204 |
| 2004/0034786 A1* | 2/2004 | Okamoto et al. | 713/189 |
| 2007/0124213 A1* | 5/2007 | Esau et al. | 705/26 |
| 2009/0094160 A1 | 4/2009 | Webster et al. | |
| 2009/0172267 A1* | 7/2009 | Oribe | G11C 16/3431 711/103 |
| 2010/0049608 A1* | 2/2010 | Grossman | 705/14.55 |

FOREIGN PATENT DOCUMENTS

WO    2006127733 A2    11/2006

* cited by examiner

*Primary Examiner* — Ranodhi Serrao
*Assistant Examiner* — Farrukh Hussain
(74) *Attorney, Agent, or Firm* — Toler Law Group, PC

(57) ABSTRACT

A file replacement system includes a storage device, a host, and a server. In a file replacement transaction one or more files that are stored in the storage device are replaced in the storage device by one or more files that are provided by the server. The storage device monitors access to the files stored therein and updates an access tracking table with segment access information that pertains to access to segments of the files. While the file replacement transaction is in progress, the storage device delivers the segment access information to the server, and, based on the segment access information and file replacement criteria, the server determines a credit to which the end-user is entitled for the replaced files. The server calculates an outstanding balance for the file replacement transaction from the credit owing to the end-user for the replaced files and from the cost of the replacement files.

24 Claims, 6 Drawing Sheets

Fig. 2

| Segment / File ID | Seg 1 | Seg 2 | Seg 3 | Seg 4 | Seg 5 | Seg 6 | Seg 7 | Seg 8 |
|---|---|---|---|---|---|---|---|---|
| Song_8.mp3 | 1 | 1 | 1 | 1 | 1 | 1 | X | X |
| Song_5.mp3 | 1 | 1 | 1 | 0 | 0 | 0 | X | 0 |
| Song_21.mp3 | 3 | 2 | 0 | 0 | X | X | X | X |
| Song_45.mp3 | 0 | 0 | 0 | 0 | 0 | 0 | 0 | X |

Fig. 3A

| File Replacement Criterion | Replacement Credit Points |
|---|---|
| C1 | 100 |
| C2 | 60 |
| C3 | 45 |
| C4 | 30 |
| C5 | 15 |
| C6 | 0 |

Fig. 3B

| File Replacement Criterion | Replacement Credit [%] | Replacement Credit [US$] |
|---|---|---|
| C1 | 100 | 4.00 |
| C2 | 60 | 2.40 |
| C3 | 45 | 1.80 |
| C4 | 30 | 1.20 |
| C5 | 15 | 0.60 |
| C6 | 0 | 0 |

410 Replace the following file(s) in your storage device:

Music Files
- ☐ Song_1.mp3
- ☑ Song_2.mp3  ⎫ 412
- ☑ Song_3.mp3  ⎭
- ☐ Song_4.mp3

Video Files
- ☐ Movie_1.avi
- ☐ Movie_2.avi

Replacement Credit Due:
*60 points (US$ 2.40)* — 414

SUBMIT SELECTION — 416

420 Please select replacement file(s) to replace your file(s) with:

- ☑ Song_5.mp3   ☐ Song_7.mp3   ☐ Song_9.mp3    ☐ Song_11.mp3
- ☑ Song_6.mp3   ☐ Song_8.mp3   ☑ Song_10.mp3  ☐ Song_12.mp3

Debit due for the current selection: *85 points (US$ 3.40)* — 422

Credit/Debit due for previous transaction(s): *0 points (US$ 0.00)* — 424

430 Current Credit/Debit due: *-25 points (-US$ 1.00)* — 432

Continue replacement / purchase?   (YES) — 436   (NO (CANCEL)) — 434

STORAGE SYSTEM SUPPORTING REPLACEMENT OF CONTENT IN A STORAGE DEVICE

FIELD OF THE INVENTION

The present invention generally relates to storage systems and more specifically to a method for replacing (e.g., trading) content in a storage device, and to systems that use the content replacement method.

BACKGROUND

Use of flash storage devices has been rapidly increasing over the years because they are portable and they have small physical size and large storage capacity. Flash storage devices that contain preloaded content (e.g., music files, video files) are readily available at retail stores. Preloaded content can be a package of files (e.g., music album) or individual files, and can be purchased on a 'cost per file' basis, 'cost per album' basis, etc.

A person may buy or receive a storage device with preloaded content, or download content to that storage device. A person may consume the preloaded content fully or partly, and the consumption may depend on taste or other considerations. A person may change his minds about consuming content s/he downloaded or simply dislike certain preloaded content. If unconsumed content was obtained for free, the person can delete it and download another content which the person likes. However, if the unconsumed content was not free, the person may want to get credit for it and use the credit to replace the content with other payable content, say, under an agreed upon files' return policy. Hence, there is a need for a mechanism that accommodates such a policy.

SUMMARY

In view of the foregoing, it would be beneficial to have a storage device, a host device and a network server that can jointly replace files stored in the storage device with other files if the files were not used at all or if the files, or some of them, were used only partly. Various embodiments of systems designed to accommodate such file replacements are possible examples of which are provided herein.

By and large, a file replacement system may include a storage device, a host device, and a network server. Files that are stored in the storage device are replaceable by the network server by other files that are selectable by the server from a pool of files. When segments of files in the storage device are accessed (e.g., read by a host device), the storage device monitors the access to the files' segments and locally stores corresponding information, which is referred to herein as "segment access information". If an end-user wants to replace a particular file in the storage device, the storage device transfers the pertinent segment access information to the server. Based on the segment access information, the server determines a file replacement criterion that is applicable to the file to be replaced, and from the file replacement criterion it determines a credit to which the end-user is entitled for the file to be replaced. The server may present potential replacement files to the end-user, and after the end-user selects replacement files to replace the file in the storage device with, the server completes a file replacement transaction that includes crediting the end-user for the replaced file.

BRIEF DESCRIPTION OF THE DRAWINGS

The accompanying drawings, which are incorporated in and constitute part of this specification, illustrate various embodiments with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures:

FIG. 2 shows an example access tracking table that is used by the content replacement system of FIG. 1;

FIG. 3A shows a table with example information regarding correlation between file replacement criterions and replacement credit points according to an embodiment;

FIG. 3B shows a table with example information regarding correlation between file replacement criterions and replacement credit monetary values for a US$4 worth file that is candidate for replacement;

FIG. 4 shows a user-host interface for replacing files in a storage device with replacement files according to an embodiment;

DETAILED DESCRIPTION

The description that follows provides various details of example embodiments. However, this description is not intended to limit the scope of the claims but instead to explain various principles of the invention and the manner of practicing it.

Figure 1:
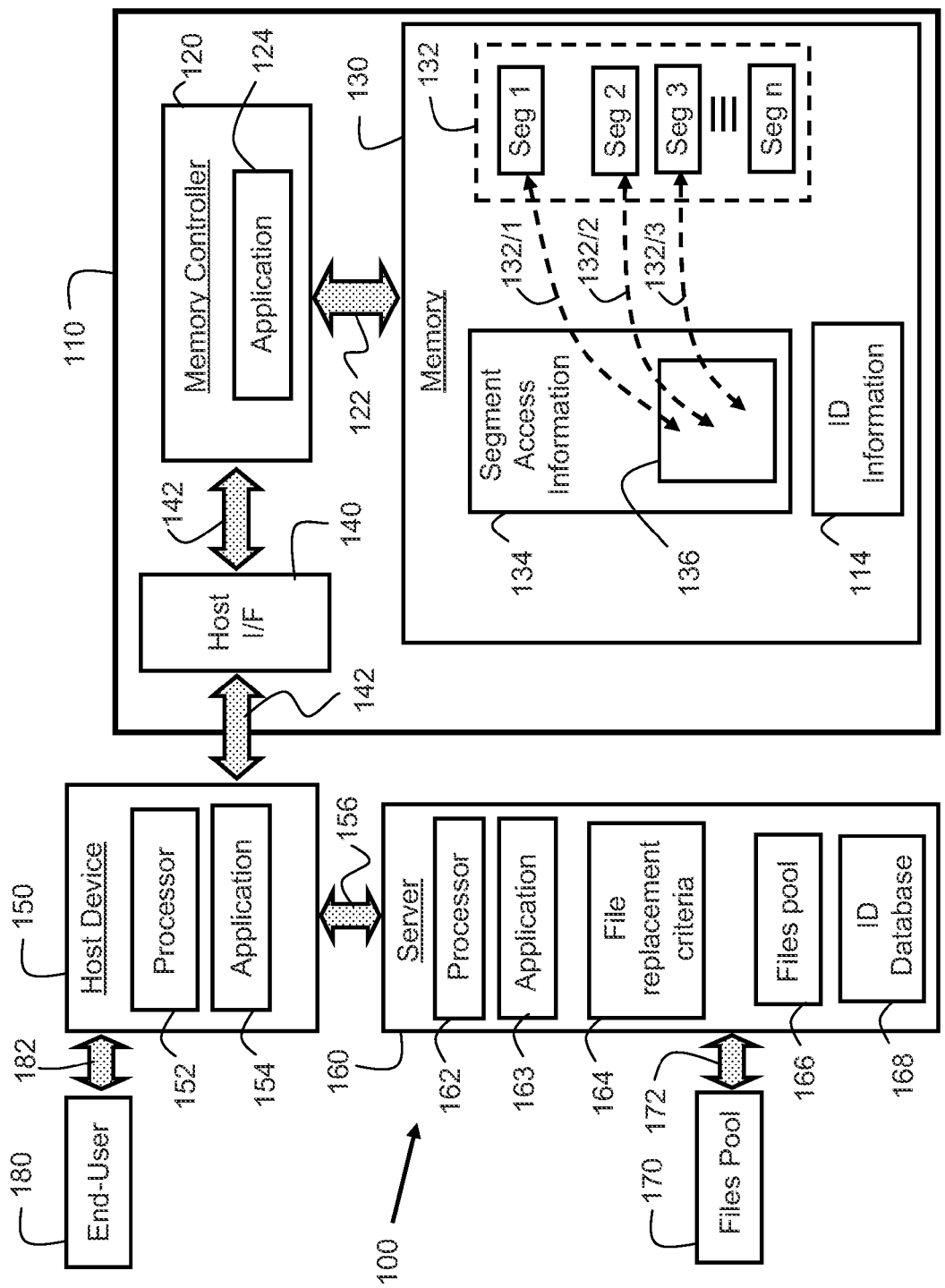
FIG. 1 shows a content replacement system according to an embodiment.

FIG. 1 shows a content replacement system 100 according to an embodiment. Content replacement system 100 includes a storage device 110 that may hold content (e.g., video files, music files, etc.), a host device 150 that operates with storage device 110, and a network server (e.g., web server) 160 for replacing files in storage device 110 with replacement files. By "replacement file" is meant a file that is downloaded into storage device 110 to replace a file in storage device 110.

Host device 150 mediates between server 160 and an end-user 180 to facilitate a negotiation process between the two parties in connection with files that end-user 180 wants to replace in storage device 110 and a credit to which s/he is entitled for replaced files. Host device 150 also mediates between server 160 and storage device 110 to facilitate transfer of segment access information from storage device 110 to server 160 regarding usage of files (i.e., access to the files' segments), and transfer of consequent replacement files in the opposite direction. The way host device 150 mediates between the parties is described below.

Memories such as memory 130 are configured with basic addressable memory units (e.g., memory sectors), and the controllers that manage them are designed to read their content one basic unit at a time. If a file is stored in its entirety, say, in ten basic memory units, then reading the entire file would require at least ten reading operations and each reading operation would involve accessing a file's segment. In this particular context, the data of a file that is stored in a basic memory unit or block is considered a "file segment". The percentage of all segments of the file that are accessed can be viewed as a "portion of a file." The percentage of the file's segments can be converted to the percentage of the entire file's bit-wise length, or to the percentage of the file's total playback time.

Typically, storage device 110 includes a memory controller 120, a memory 130 for storing digital content of various types (e.g., ten video files and 120 music files), and a host interface 140 for interfacing with host device 150. Memory controller 120 manages data transfers 122 to and from memory 130. Host device 150 includes a processor 152. Processor 152 executes an application 154 to perform the steps, procedures, decisions, and data transfers between storage device 110 and network server 160 that are described below. Server 160 includes a processor 162 and file replacement criteria table 164.

Server 160 is configured to replace files in storage device 110 with one or more replacement files based on information held in a file replacement criteria table 164. As end-users are charged a fee for downloading content that is not complimentary (e.g., copyright protected content), replacement criterions, which are held in the file replacement criteria table 164, define various files usage conditions. Server 160 provides credit to an end-user for a file based on the file usage conditions (e.g., the file was used in its entirety, only 10% of the file was used, etc.).

When storage device 110 is operatively connected to host device 150, end-user 180 can consume files that are stored in memory 130 by interacting with host device 150. With regard to consuming, playing, or using files, host device 150 may be a cellular phone, a personal computer, a media player, a music player, etc. End-user 180 can also interact with host device 150 to trade files stored in memory 130 for other files. "Trading a file in a storage device" means replacing the file by other file(s). For example, if a US$5.0 worth video clip that is stored in memory 130 has not been played back at all, it may be replaced (i.e., by server 160 and via host device 150) by another US$5.0 worth video clip, or with two US$2.5 worth video clips, or with one US$2.5 worth video clip and one US$2.5 worth music file.

Storage device 110 contains an access tracking table 134. Access tracking information includes segment access information regarding access to segments of files that are stored in the memory 130. A file may be stored in contiguous basic memory units (i.e., memory addresses), or it may be interspersed across various basic memory units of the memory 130. Assume that segments of file 132 are interspersed within memory 130. The segments of the file 132 are shown in FIG. 1 as segments "Seg 1", "Seg 2", "Seg 3", . . . , "Seg n". Memory controller 122 maintains the access tracking table 134 for future reference. Such future reference, may include transferring (e.g., to host device 150) the segment access information for one or more files in memory 130 in response to a request that pertains to these files.

Assume that end-user 180 interacts with host device 150 to play file 132. During the file's playback, host device 150 reads one file segment after another (e.g., Seg 1", then "Seg 2", etc.), and, as the file's segments are accessed, memory controller 120 monitors the file's reading process and updates segment access information 136 with information pertaining to the read segments. Segment access information 136 specifies the segments that were read (e.g., "Seg 1", "Seg 2", "Seg 3"), and the number of times that each segment was read (i.e., accessed).

Memory controller 120 'knows' which file portion or segment of each file is read by host device 150 because memory controller 120 reads the data for, and thereafter provides it to, host device 150. Knowing which file segment is read, memory controller 120 updates the content of access tracking table 134 every time a file's segment is read. This way, it is known, at any given time, how many (and which) segments of each file were read, and how many times each file segment was actually read. This information is essential because end-user 180 is credited by server 160 for unused (i.e., unconsumed) files and for partly used files based on this information.

Assume that end-user 180 stops the file's play back after s/he consumes only "Seg 1", "Seg 2", and "Seg 3" of file 132. After memory controller 120 reads "Seg 1" for host device 150, it stores segment access information in access tracking table 134 that is related to the reading of segment "Seg 1". Storing the segment access information pertaining to the reading of file segment "Seg 1" is shown at 132/1. Likewise, storing the segment access information pertaining to the reading of file segments "Seg 2" and "Seg 3" is shown at 132/2 and 132/3, respectively.

Assume that end-user 180 wants to "trade" file 132 (i.e., replace it) with other files. Processor 152, in conjunction with a file replacement application (i.e., application 154), receives 182 a request from end-user 180 to replace (i.e., trade) a particular file (in this example file 132) that is stored in memory 130. End-user 180 may want to replace file 132, for example, because s/he has limited interest or no interest at all in that file.

Server 160 has to receive 156 information from host device 150 regarding usage (i.e., reading) of file 132 in order to be able to calculate a 'file-usage related' credit for end-user 180. Server 160 can post one or more replacement files to end-user 180 through host device 150 in exchange for file 132 only after it calculates the credit to be granted to end-user 180. Therefore, prior to host device 150 transferring the relevant segment access information to server 160, end-user 180 does not know which files s/he can trade file 132 for. A maximum credit provided for a file to be replaced may change from time to time. For example, a maximum credit for a song may be at its peak when the song is first released; less credit may be provided for a song as the song gets less popular; and more credit may be provided for a song if the performer of the song performs on stage in live concerts.

In response to the request that processor 152 receives from end-user 180, processor 152, in conjunction with application 154, requests 142 segment access information from memory controller 120 which pertains to the reading of file 132. Alternatively, processor 152 may request segment access information to all the files that are stored in memory 130. In response to the information request that processor 152 transfers to memory controller 120, memory controller 120 retrieves 122 from the memory 132 segment access information 136 or the entire access tracking table 134 content and transfers 142 the retrieved information to processor 152. Processor 152, then, transfers 156 segment access information 136 or access tracking table 134 (whichever the case may be) to processor 162 for analysis.

In one implementation, analyzing access tracking table 134 by processor 162 includes parsing access tracking table 136 to extract the identity of the file(s) to be replaced (in this example one file; e.g., file 132), the identity of the segments of the file that were played (in this example segments "Seg 1", "Seg 2", and "Seg 3" of file 132), and the number of times each segment was played (in this example each segment was played once). In another implementation, only specific segment access information (e.g., segment access information 136 for file 132) is transferred and, in such a case, no complex analysis (e.g., parsing) would be required.

Processor 162 uses segment access information 136 to find a replacement criterion in file replacement criteria table 164 that is applicable to file 132 as used. File replacement criteria 164 is derived from a file replacement policy. If processor 162 finds a particular replacement criterion in file replacement criteria table 164 which is applicable to file 132, it uses the applicable replacement criterion to determine a replacement credit to which end-user 180 is entitled for the traded file(s). (Note: each replacement criterion is associated with a predetermined replacement credit that may be expressed as "credit points"; e.g. 26 points for a file named "Song_1", or as a "credit percentage"; e.g., 40% of a file's cost, as respectively exemplified in FIG. 3A and FIG. 3B.) Processor 162, then, converts the replacement credit into monetary credit (e.g., US$0.5).

Concurrently to the determination of the monetary credit to be provided to the end-user, processor 162 presents descriptive information to end-user 180, via host device 150, of potential replacement files from which end-user 180 can select M (M≥1) replacement files. Upon selection of the M replacement files by end-user 180, processor 162 may obtain the selected replacement files from a local pool of files (e.g., files pool 166), or from a remote pool of files (e.g., files pool 170) via a network connection 172, or from both local files pool 166 and remote files pool 170. As each replacement file selected by end-user 180 has a monetary value, processor 162 calculates the total cost of the selected replacement file(s) and debits, or credits (as the case may be), end-user 180 for the difference between the amounting cost of the selected replacement file(s) and the monetary credit provided to the end-user for the replaced file(s).

After memory controller 120 provides the segment access information to host device 150, memory controller 120 may temporarily prohibit storage operations on the file(s) to be replaced until it receives the replacement file(s) from server 160. After memory controller 120 receives the replacement file(s) from server 160, it replaces the file(s) to be replaced by the replacement file(s). By "replacing a file in a storage device" is meant herein deleting the file completely prior to or, preferably, after the memory controller stores the replacement file(s), or limiting the access to the file or to a predetermined portion of the file. An access to a file may be limited in cases where it is desired to maintain a sample of the file's content in the storage device. For example, access may be allowed only to 15% of the file's content. Memory controller 120 permits storage operations on the file if the file is found by server 160 to be ineligible for replacement, for example, because the file was used excessively (as per the files return policy and the pertinent segment access information).

Server 160 may be a web server, and files pool 170 may reside in another web server. Host device 150 may be a personal computer ("PC"), a laptop, a cellular phone, etc. Files' segments may be accessed by a device other than host device 150. The other device may be, for example, a media player, a music player, a cellular phone, etc. Host device 150 may communicate with server 160 over the internet by using wireless communication connection or wired communication connection.

In general, the less a file is used by end-users the more "replacement credit" is given to them by server 160 for replacing the file. If a file in memory 130 is not played at all, end-user 180 receives maximum credit for it, which may be the original cost of the file. This means that server 160 can offer to an end-user 180, through host device 150, a relatively wide selection of replacement files from which end-user 180 can choose. For example, if the cost of file 132 is, say, US$4.0, a full credit of US$4.0 may be granted to the end-user. The end-user may use the US$4.0 credit to trade file 132 for one replacement file that also costs US$4.0, or for two replacement files that cost US$2.0 each, or for two files that cost US$2.5.0 and US$1.5, etc.

On the other hand, if usage of a file in memory 130 meets a non-replacement criterion, for example it was played at least "X" (X≥1) times (e.g., 1.5 times), the file is deemed unreplaceable. This means that end-user 180 would not receive any replacement credit for such files. If end-user 180 wants to replace a particular file in memory 130 but, based on the pertinent segment access information and file replacement criteria table 164, server 160 denies the replacement, the end-user may purchase new files from server 160, via host device 150, in a regular way (e.g., by debiting her/his bank account for each purchased file).

File replacement criteria table 164 provides for replacement scenarios other than the two extremes (i.e., granting end-users full credit or zero credit) that are described above. Namely, if end-user 180 plays only a small portion of a file, say, 20% of the total playback time of the file, or only 25 segments of a total of 150 segments of the file (a different example), s/he may be granted a credit that is greater than zero and less than the maximum credit that would have been provided for that file if it were not played at all. The replacement credit granted to an end-user for a file is, in general, inversely proportional to the usage of the file (i.e., more usage means less credit). As explained above, the segment access information reflects the usage of files that are stored in memory 130. The way segment access information is compiled by storage device 110 and used by server 160 to replace files in memory 130 is described below.

FIG. 2 is an example access tracking table 200 according to an embodiment. FIG. 2 will be described in association with FIG. 1. Access tracking table 200, which is an example of access tracking table 134, may include a "File Identifier" (e.g., file's name) field and "Segments Access Information" fields that are designated as "Seg 1", Seg 2", etc. Access tracking table 200 includes an entry for each playable file that is stored in storage device 110. Each entry contains segment access information for each segment of the associated file. For example, entry 210 is associated with file "Song_5.mp3" and includes segment access information for each segment of the file. The segment access information contained in each entry specifies the number of times each segment of the associated file was accessed (e.g., during playback). By way of example, access tracking table 200 contains information for four files, which are designated as "Song_8.mp3", "Song_5.mp3", "Song_21.mp3", and "Song_45.mp3".

Different files typically have different numbers of segments because the number of the segments of a file depends on the total bit-wise size of the file. By way of example, file "Song_8.mp3" has six segments altogether; "Song_5.mp3" has eight segments altogether; "Song_21.mp3" has four segments altogether; and "Song_45.mp3" has seven segments altogether. For illustration purpose, files "Song_8.mp3", "Song_5.mp3", "Song_21.mp3", and "Song_45.mp3" have a relatively low number of segments (i.e., eight segments or less). However, a file may have thousands of segments.

By way of example, file Song_8.mp3 was played once in its entirety (i.e., all of its segments were accessed once). Therefore, all the segment field entries associated with file Song_8.mp3 contain the value "1". File Song_5.mp3 was partly played. As explained above, only segments "Seg 1" through "Seg 3" of file Song_5.mp3 were played. Therefore, only segment fields "Seg 1", "Seg 2", and "Seg 3" associated with file Song_5.mp3 have values greater than zero, as shown at 210, and because each of file segments "Seg 1", "Seg 2", and "Seg 3" of file Song_5.mp3 was accessed once, these values are "1s". Regarding file Song_21.mp3, it is assumed that its first segment and second segment were respectively played back three times and two times, while the other segments of file Song_21.mp3 were not played at all. Accordingly, segment fields "Seg 1", "Seg 2", "Seg 3", "Seg 4" corresponding to file Song_21.mp3 have the values "3", "2", "0", and "0", respectively. File Song_45.mp3 was not played at all. Therefore, each of segment fields "Seg 1", "Seg 2", "Seg 3", . . . , "Seg 7" corresponding to file Song_45.mp3 has the value "0". If segments of files that were already accessed are accessed again, or segments that have not been accessed so far are accessed for the same time, memory controller 120 updates the data held in the corresponding segment field entries accordingly.

FIG. 3A shows a file replacement criteria table 300 according to an embodiment. FIG. 3A will be described in association with FIG. 1 and FIG. 2. File replacement criteria table 300, which is an example of file replacement criteria table 164, includes a "File Replacement Criterion" field, and a "Replacement Credit Points" field. File replacement criteria table 300 holds exemplary information regarding correlation between file replacement criterions and replacement credit points. The file replacement criterions and the correlated replacement credit points are predetermined (e.g., by the operator of server 160 or by the distributor of storage device 110). By way of example, file replacement criteria table 300 includes six file replacement criterions that are designated as "C1", "C2", "C3", "C4", "C5", and "C6". Each file replacement criterion specifies a file usage condition that grants the end-user a specific replacement credit whose value can be zero, maximum, or in-between these limits. For example, file replacement criterion "C1" may apply to cases where 0% to 20% of the total number of file segments of a file were accessed once; file replacement criterion "C2" may apply in cases where 20% to 40% of the total number of file segments of a file were accessed once; file replacement criterion "C3" may apply in cases where 40% to 60% of the total number of file segments of a file were accessed once; file replacement criterion "C4" may apply in cases where 60% to 80% of the total number of file segments of a file were accessed once; and file replacement criterion "C5" may apply in cases where 80% to 100% of the total number of file segments of a file were accessed once. Other or additional file replacement criterions may be used to specify other usage conditions of files. If a file's usage condition complies with more than one file replacement criterions, the first file replacement criterion may be used as default, given that the file replacement criterions are orderly listed. If a file's usage condition cannot be associated with (i.e., covered by) any of criterions C1 through C5, a default replacement criterion (i.e., "C6") may be applied to that file. For example, applying criterion C6 to a file may mean providing zero credit to the end-user for that file, as shown in table 300.

File replacement criterions may be devised based on percentage of files that were read. File replacement criterions may also be devised based on relative locations, importance, or significance of file segments within the file. To that end, different segments may be assigned a "contextual weight" that would reflect their relative significance/importance. For example, if a user file contains a recorded sports program (e.g., football match), file segments featuring the highlights of the match (e.g., instants at which goals are scored) may be assigned weights that are much higher than weights that are assigned to other segments (e.g., 0.97 vs. 0.15), and other segments may be assigned a much lower weight (e.g., 0.15). In another example, file segments that feature climax scenes of a thriller may be assigned weights that are much higher than segments that feature pre-climax scenes or post-climax scenes. Continuing the examples above, if, for example, end-user 180 plays most of the segments that feature the goals in the football match, or the end-user plays most (e.g., at least 75%) of the segments that feature the climax scenes, the end-user will not be granted much credit for the pertinent file even if s/he does not play any other segments of the file. Other file replacement criterions may be devised, which can be simpler or more complex than the file replacement criterions exemplified herein. For example, a criterion may be devised for a file usage condition where one or more segments of a file are accessed once and/or one or more segments are accessed twice, and/or one or more segments are accessed three times, etc.

By using the exemplary information in file replacement criteria table 300, server 160 would give maximum credit of 100 points for a file that complies with file replacement criterion C1; 60 credit points for a file that complies with file replacement criterion C2; 45 credit points for a file that complies with file replacement criterion C3; credit points for a file that complies with file replacement criterion C4, and so on. Credit points may have a same monetary value (e.g., US$0.23), or progressive monetary values (e.g., US$0.10 for the first 5 points, US$0.21 for the next 6 points, etc.).

FIG. 3B shows a file replacement criteria table 310 according to another example embodiment. File replacement criteria table 310, which is another example of file replacement criteria table 164, includes a "File Replacement Criterion" field, a "Replacement Credit [%]" field that holds credit percentages to which end-users are entitled for replacing files, and a "Replacement Credit" field. File replacement criteria table 310 holds exemplary information regarding correlation between file replacement criterions and monetary values to be credited to a user for a US$4.00 worth file that is candidate for replacement. For example, if end-user 180 wants to replace file 'x' in memory 130 and processor 162 determines that file replacement criterion "C1" applies to file 'x', this means that end-user 180 is entitled to the maximum credit (e.g., US$4.00). If, however, processor 162 determines that file replacement criterion "C3" applies to file 'x', this means that end-user 180 is entitled to a credit that amounts to 45% of the current cost of file 'x'. If, for example, file 'x' costs, say, US$4.0, then end-user 180 is entitled to a credit of US$1.80 (i.e., 45%×US$4.0). In other words, the actual monetary credit provided to end-users is a function of the replacement credit percentage and the current cost of the file to be replaced. Costs of files may change over time, and a file that was originally purchased for, say, US$5.0 may have, weeks later, a maximal replacement value of, say, US$3.8. "Maximal replacement value" may reference a replacement value provided for a file that none of its segments was accessed.

The content of the "File replacement Criterion" field, the content of the "Replacement Credit Points" field of FIG. 3A, and the content of the "Replacement Credit [%]" field of FIG. 3B, are known a priori from the files' returning policy. However, the operator of server 160 (not shown in FIG. 1) can remove a criterion, add a new criterion, change a criterion, change a number of replacement credit points or percentage provided for a particular criterion, etc. These contents are used to calculate the usage-dependent monetary values of the files to be replaced.

Returning to FIG. 2, assume that end-user 180 wants to replace the file Song_5.mp3 with other file(s). Processor 162 calculates the percentage of file Song_5.mp3 that end-user 180 used from the data held in access tracking table 200. Because 37.5% of file Song_5.mp3 were played (i.e., three eighths of the file's segments were read once, as shown at 220), processor 162 infers that, at the time of the replacement, replacement criterion "C2" applies to the file Song_5.mp3. Replacement criterion "C2" applies to file Song_5.mp3 because, as exemplified above, file replacement criterion "C2" applies in cases where 20% to 40% of the segments of a file were accessed once, and the current usage percentage (37.5%) of file Song_5.mp3 falls within this range. Returning again to FIG. 3B, according to access tracking table 310 the replacement credit [%] corresponding to replacement criterion "C2" is 60% (as shown at 320). Assuming that the current cost of file Song_5.mp3 is US$4.0, end-user 180 is entitled to a monetary credit of 60% of that cost; namely, to US$2.4 (0.60×US$4.0).

FIG. 4 shows a user-host interface for replacing files in a storage device with replacement files according to an embodiment. FIG. 4 will be described in association with FIG. 3A and FIG. 3B. Assume that processor 162 receives 182 a request from end-user 180 to replace one or more files that are stored in memory 130. Responsive to the user's request, host device 150 displays user-host interactive interface 400 on a computer display of or associated with host device 150. User-host interactive interface 400 enables a dialog between end-user 180 and server 160 with regard to files to be replaced and replacement files. For illustration purpose, user-host interactive interface 400 is functionally divided to three separate interactive regions, which are designated as 410, 420, and 430.

Interactive region 410 presents to end-user 180 all or selected playable files that are stored in storage device 110. By way of example, the files presented to the end-user are "Song_1.mp3", "Song_2.mp3", "Song_3.mp3", "Song_4.mp3", "Movie_1.avi", and "Movie_2.avi". End-user 180 may select one or more of the presented files for replacement. By way of example, files "Song_2.mp3" and "Song_3.mp3" (shown at 412) are selected for replacement (the selection is shown as marked "check marks"). Interactive region 410 includes a "replacement credit due" output field 414 and a "submit selection" button 416. "Replacement credit due" field 414 displays the amounting credit relevant to the end-user's selection. The data displayed in this field is changed as the file's selection changes. As per the present selection of files 412, the replacement credit due to end-user 180 is 60 credit points or US$2.40. To conclude the selection of the files to be replaced, end-user 180 may depress "submit selection" button 416 to confirm the selection to server 160 so that server 160 can factor in the credit owing to the end-user when the end-user is debited for replacement files that s/he selects. Alternatively, no confirmation is required (i.e., the "submit selection" can be omitted).

Interactive region 420 presents to end-user 180 descriptive information about replacement files from which end-user 180 can select one or more files. By way of example, files "Song_5.mp3", "Song_6.mp3", and "Song_10.mp3" are selected for replacing the files "Song_2.mp3", and "Song_3.mp3" in storage device 110. Interactive region 420 includes a "Debit/Credit due for the current selection" output field 422, and a "Credit/Debit credit due for previous transactions" output field 424. As per the present selection of replacement files "Song_5.mp3", "Song_6.mp3", and "Song_10.mp3", the debit due to end-user 180 is 85 credit points or US$3.40, as shown at 422. It is assumed that the end-user has no previous standing credit or debit, for which reason this value is zero (i.e., zero point, US$0.0, as shown at 424).

Interactive region 430 presents to end-user 180 a current summary or status of the file replacement transaction. Continuing the example, the end-user is to be debited, after deducting her/his credit, for 25 points (i.e., 60-85) or, equivalently, for US$1.00 (i.e., 2.40-3.40), as shown at 432. End-user 180 can change her/his selection of replaced files and replacement files at any time, and the value appearing in field 432 would change accordingly.

End-user 180 may revert from window 400 to a previously displayed window by clicking on a "NO (CANCEL)" button 434. End-user 180 may continue the file replacement transaction by clicking on a "YES" button 436. In response to clicking on the "YES" button, server 160 uses the descriptive information pertaining to files "Song_5.mp3", "Song_6.mp3", and "Song_10.mp3" to retrieve the pertinent files from files pool 166, or from files pool 170, or from both files pools.

Figure 5:
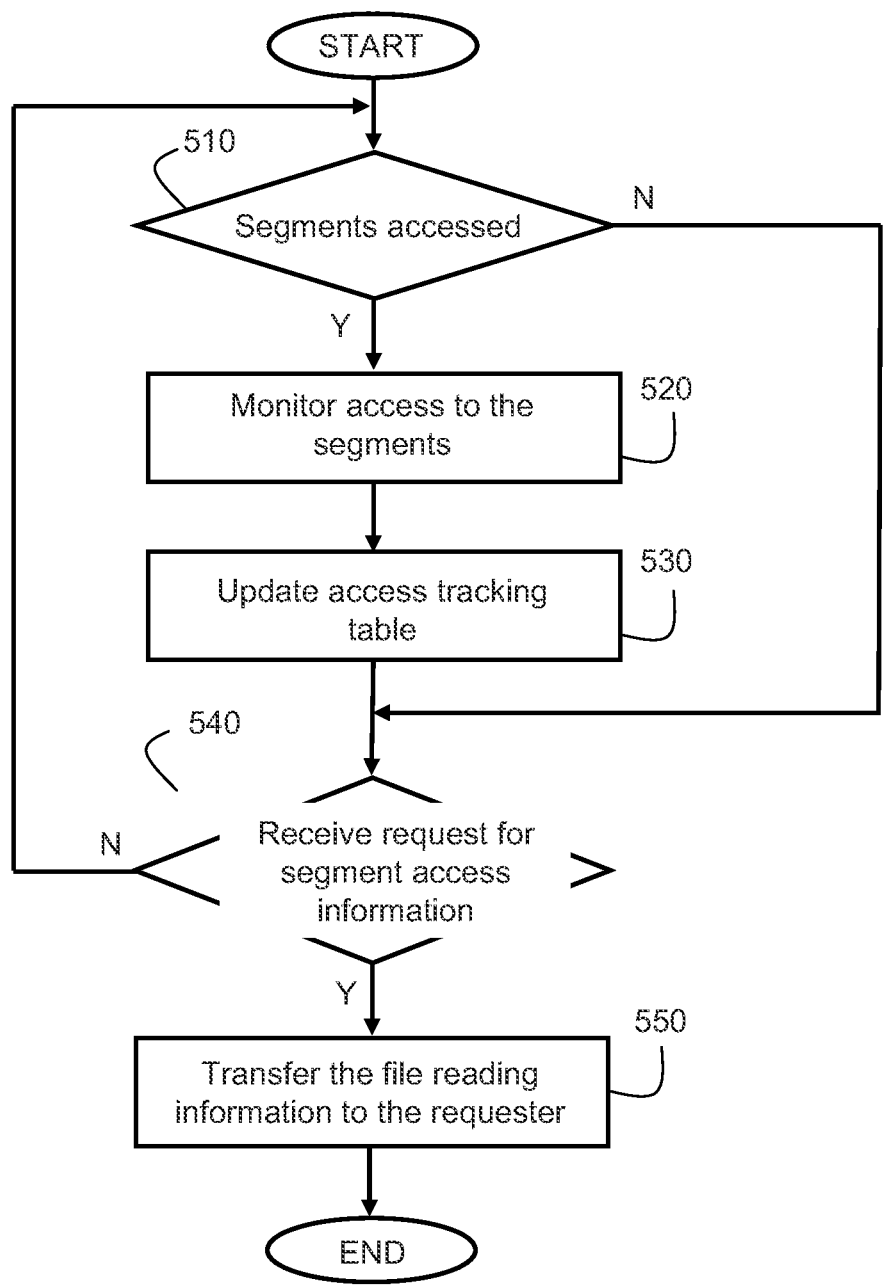
FIG. 5 is a method for compiling segment access information for a server.

FIG. 5 is a method for compiling segment access information. FIG. 5 will be described in association with FIG. 1. At step 510, memory controller 120 checks whether any segment of any file that is stored in memory 130 is accessed. If segments are accessed (shown as "Y" at step 510), memory controller 120 monitors access to the segments, at step 520, and updates access tracking table 134 accordingly, at step 530.

If memory controller 120 does not receive a request (e.g., from host device 150) for the segment access information (shown as "N" at step 540), memory controller 120 checks at step 510 whether the same or other segments are accessed. If memory controller 120 receives a request, for example, from processor 152 for the segment access information (shown as "Y" at step 540), memory controller 120 transfers an up to date version of the segment access information to processor 152.

Figure 6:
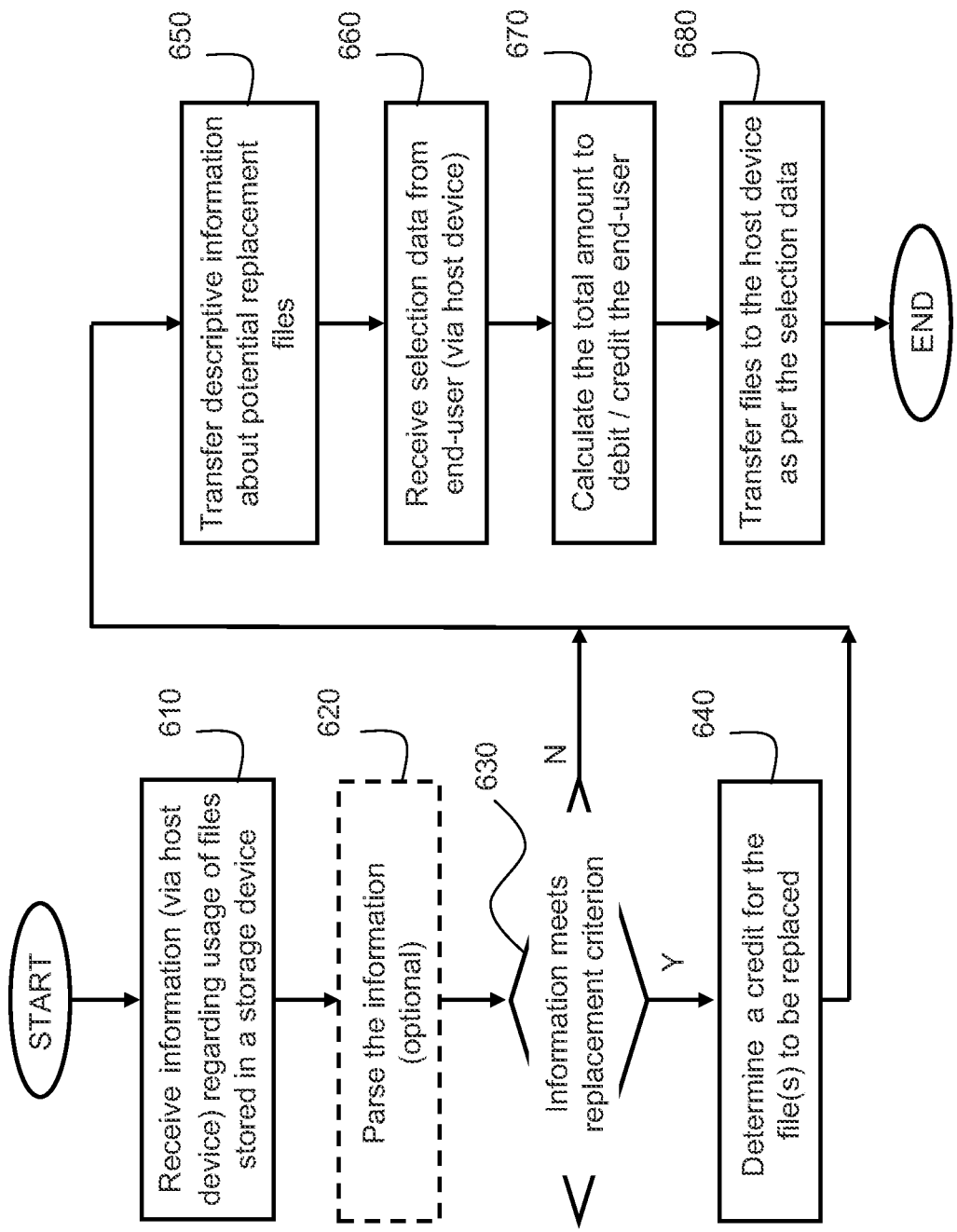
FIG. 6 is a method for replacing files in a storage device according to an embodiment.

FIG. 6 is a method for replacing files in a storage device according to an embodiment. FIG. 6 will be described in association with FIG. 1. At step 610, server 160 (i.e., processor 162) receives segment access information from host device 150 (i.e., processor 152) regarding usage of files that are stored in storage device 110. Server 160 receives the information in response to end-user 180 submitting a request to host device 150 to replace particular one or more files in storage device 110.

Based on the request submitted by the end-user 180 to replace the particular file(s), host device 150 may send to server 160 only the segment access information pertaining to the particular file(s). Alternatively, it may send to server 160 segment access information that pertains to all the files in memory 130, and, in such a case, server 160 would have to parse the information, at step 620 (an optional step), in order to extract the relevant segment access information. Host device 150 may send additional information to server 160, which notifies server 160 of, or refers server 160 to the relevant segment access information.

At step 630, server 160 checks whether the segment access information pertaining to the file(s) to be replaced complies with any of the credit granting file replacement criterions specified in file replacement criteria 164. If it complies with a credit granting file replacement criterion (shown as "Y" at step 630), server 160 infers, at step 640, the pertinent credit. If the segment access information does not comply with any credit granting file replacement criterion (shown as "N" at step 630), server 160 refrains from crediting the end-user.

At step 650, server 160 transfers to host device 150 descriptive information about potential replacement files from which the end-user can select one or more files. Host device 150 presents the descriptive information to the end-user, and the end-user uses the descriptive information to select one or more replacement files. At step 660, server 160 receives selection data that represent the end-user's selection, and, at step 670, server 160 calculates the total amount of debit or credit resulting from the file replacement transaction. At step 680, server 160 concludes the file replacement transaction by transferring the consequent replacement files to host device 150, as per the selection of end-user 180 made through host device 150, and storing the transactional debit or credit. A credit owing to the end-user or a debit of the end-user may be transferred to a future file replacement transaction or settled in a way agreed upon by the involved parties. If N (N≥1) files are to be replaced in the storage device, a credit may be provided for the files individually and then added up. There may be cases, for example when package deals or special deals are offered to the end-user, where a credit may be determined collectively for a bundle of files.

Storage device 110 replaces a file in storage device 110 with replacement file(s) if the file reading information stored in storage device 110 has not changed at all or if it has changed within an allowed margin. For example, if less than 3% of the file to be replaced was read after storage device 110 transferred the segment access information to server 160, the segment access information, after the change, may still be regarded by storage device 110 as complying with the current applicable replacement criterion. To facilitate the aforesaid feature, storage device 110 stores a copy of the segment access information transferred to host device 150 (and through it to server 160) and uses it as described below in connection with FIG. 8.

Figure 7:
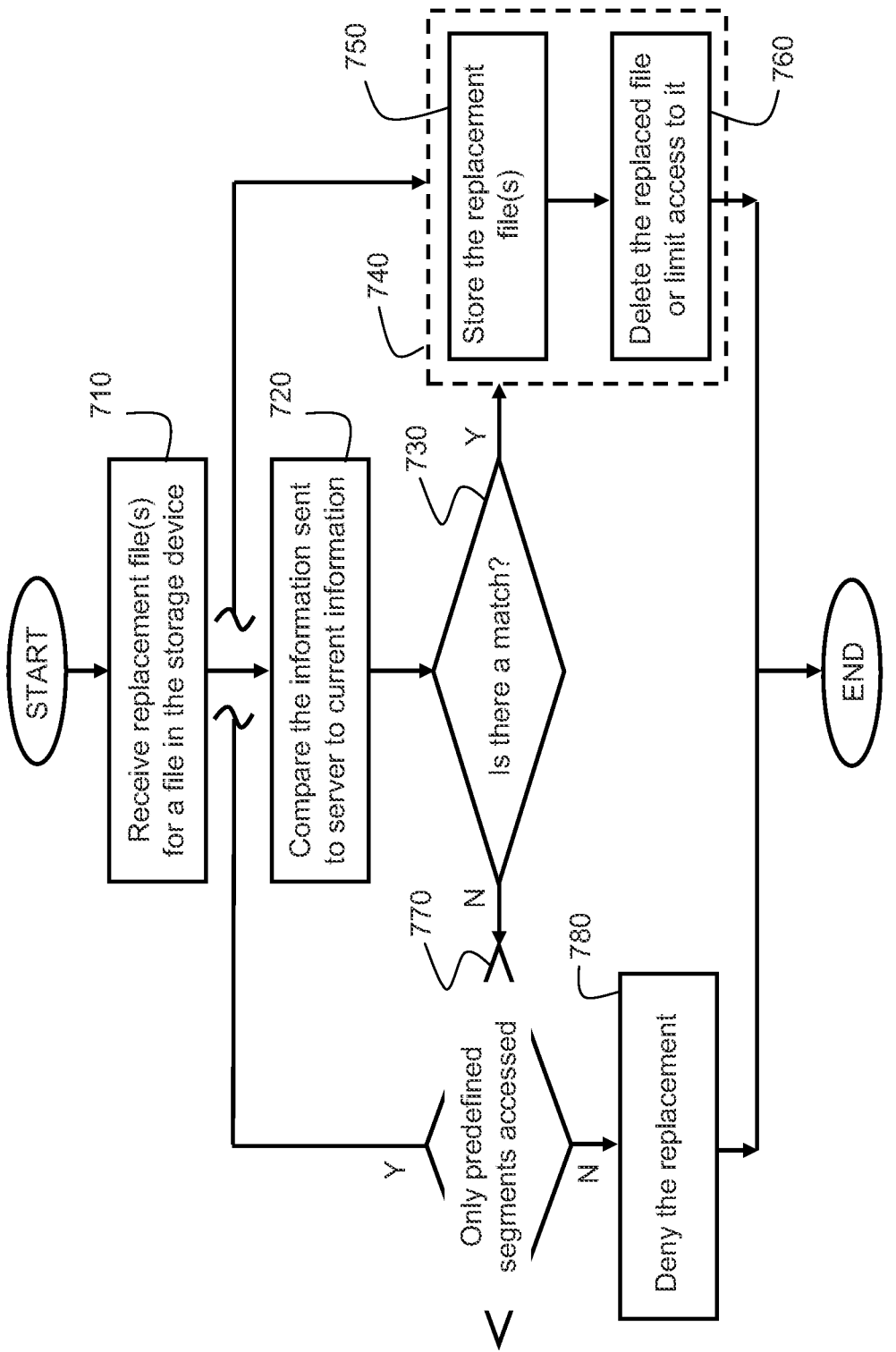
FIG. 7 is a method for enforcing a file replacement criterion in a storage device according to an embodiment.

FIG. 7 is a method for enforcing a file replacement criterion in a storage device according to an embodiment. FIG. 7 will be described in association with FIG. 1. Assume that server 160 transfers replacement files to storage device 110, via host device 150, in order for them to replace a particular file in memory 130. Memory controller 120 may be configured to operate in one of the following ways: (1) immediately after memory controller 120 sends the pertinent segment access information to server 160 memory controller 120 denies access to any of the segments of the particular file. Denying access to the file at this stage guarantees that the file is not accessed while the replacement files are transferred to the storage device; (2) after memory controller 120 sends the segment access information to server 160 memory controller 120 regards an additional access to any segment of the file as a violation of the pertinent replacement pre-condition and, therefore, memory controller 120 refrains from replacing the file; (3) if one or more segments of a file are accessed between the time memory controller 120 sends the segment access information to server 160 and the time memory controller 120 receives the consequent replacement files, memory controller 120 (i) refrains from replacing the files, and (ii) sends an up to date segment access information to server 160. Server 160, then, checks whether the credit already provided during the current file replacement transaction is still valid in view of the changes. If it is still valid, server 160 sends a permission message to memory controller 120 to complete the file replacement process. If the credit is no longer valid, server 160 may terminate the current file replacement transaction and start a new transaction. Server 160 may regard a credit valid despite changes in the segment access information if accessed segments belong to a predetermined group of segments that are permitted to be accessed freely or an allowed number of times. The predetermined group of segments that are permitted to be accessed after memory controller 120 sends the segment access information to server 160 may be segments that were hard-coded into the file. For example, hard-coded segments may contain the subtitles of a video file, or they may be used to preview a file, etc. The number of the segments may depend on the type of the involved file (".mp3", ".avi", etc.).

At step 710, memory controller 120 receives the replacement files from host device 150. As explained above, memory controller 120 may store in storage device 110 a copy of the segment access information it transfers to server 160. It may take the replacement files some time (e.g., seconds or minutes) to reach storage device 110. While memory controller 120 waits to receive the replacement files, end-user 180 may intentionally or mistakenly play the file to be replaced, or a portion thereof. Playing a file (or a portion thereof) while memory controller 120 waits to receive the replacement files may invalidate the segment access information transferred to server 160, as explained above. Therefore, at step 720, upon receiving the replacement files from server 160, memory controller 120 compares the current segment access information, which is updatable by memory controller 120 in real-time, to the copy of the segment access information that was transferred to the server.

At step 730, memory controller 120 checks whether the current segment access information is identical to the segment access information that was transferred to server 160. If they are identical (shown as "Y" at step 730), this means that there is no violation of the pertinent file replacement criterion. Therefore, at step 740, memory controller 120 replaces the file to be replaced by the replacement files; namely, at step 750 memory controller 120 stores the replacement file(s) in memory 130 and, at step 760, it deletes the replaced file or limits access to it, as explained above. If the current segment access information is not identical to the segment access information that was transferred to server 160 (shown as "N" at step 730), this means that segments of the file were accessed again after the segment access information was sent to server 160. Therefore, at step 770, memory controller 120 identifies the accessed segments and checks whether the accessed segments belong to a predetermined group of segments to which an access is allowed. If memory controller 120 determines that they are (shown as "Y" at step 770), memory controller 120 replaces, at step 740, the file by the replacement files. If memory controller 120 determines that at least one accessed segment does not belong to that group (shown as "N" at step 770), memory controller 120 denies the replacement at step 780. By using the method of FIG. 7, or a similar method, server 160 can trust storage device 110 to reject the file replacement if an unauthorized operation was made on the file to be replaced during the replacement files' delivery stage.

Returning again to FIG. 1, server 160 checks a prerequisite requirement prior to commencing the file replacement procedure described above. The prerequisite requirement is that the storage device and/or the file(s) to be replaced originate from authorized distributor. If server 160 receives a request to replace a file in storage device 110 and neither storage device 110 nor the file originates from an authorized distributor, server 160 denies the request to replace the file.

Storage devices are sometimes sold with preloaded content (i.e., the content, for example music files, is downloaded into them by content providers rather by the end-users). In such a case, a storage device can be distributed with identification ("ID") information (e.g., ID information 114) that pertains to the identity of the storage device, and/or to the identity of the files stored in the storage device, and/or to the identity of the content provider who distributed the storage device and/or files. Alternatively or additionally, an end-user may download files from a content provider with embedded ID information that pertains to the identity of the file and/or to the identity of the seller or distributor of the file.

When memory controller 120 receives a request from host device 150 to provide segment access information, it transfers the requested information and the pertinent ID information to host device 150 in separate communications or in one communication in which the ID information is appended to the segment access information. Memory controller 120 may encrypt the ID information and/or the segment access information so that they can not be tampered with.

Host device 150 sends the encrypted segment access information and the encrypted ID information to server 160. Host device 150 does not have means to decrypt the segment access information and the ID information. Server 160 decrypts the information and uses data stored in a local ID database 168 to determine whether storage device 110 and/or the file to be replaced were originally distributed by an authorized distributor. Server 160 commences the file replacement procedure described above if the determination is positive with regard to storage device 110 or the file to be replaced.

If server 160 commences the file replacement procedure, it encrypts the consequent replacement files so that these files can not be tampered with (e.g., used without permission). Then, server 160 sends the encrypted files to storage device 110 via host device 150. Storage device 110 then decrypts the encrypted files and stores the files in memory 130. Alternatively, storage device 110 stores the files without decrypting them.

Memory controller 120, processor 152, and processor 162 can be a standard off-the-shelf System-on-Chip ("SoC") device or a System-in-Package ("SiP") device or general purpose processing unit with specialized firmware, software or application (e.g., applications 124, 154, and 163) that, when executed by the pertinent controller/processor, performs the configurations, steps, operations, determinations and evaluations described herein. Alternatively, the controller and processors can be an Application-Specific Integrated Circuit ("ASIC") that implements the configurations, steps, operations, determination and evaluations described herein by using hardware.

The articles "a" and "an" are used herein to refer to one or more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of mass storage devices such as memory cards, SD-driven flash memory cards, flash storage devices, USB Flash Drives (""UFDs"), MultiMedia Card ("MMC"), Secure Digital ("SD"), miniSD and microSD, and so on. Hence the scope of the claims that follow is not limited by the disclosure herein.

What is claimed is:

1. A method comprising:
   in a storage device including a memory and a memory controller that manages the memory, performing by the memory controller:
   detecting reading of a first file segment of a file that comprises a plurality of file segments stored in the memory, the plurality of file segments including at least the first file segment and a second file segment, each of the plurality of file segments associated with the file in a file access tracking table stored in the memory;
   in response to detecting the reading of the first file segment, updating an entry corresponding to the file in the file access tracking table, the entry including file segment access information indicating a number of times each of at least the first file segment and the second file segment has been read, wherein the file segment access information indicates that the first file segment has been accessed more than one time; and
   sending the file segment access information to a host device coupled to the storage device, the file segment access information indicating replacement of the file with one or more replacement files conditioned on one or more of the file segment access information satisfying a return policy associated with the file, the file segment access information not changing during a time period associated with the file, and the file segment access information changing only within an allowed margin during the time period associated with the file.

2. The method as in claim 1, further comprising receiving, from a server via the host device, an identification of a second file.

3. The method as in claim 1, wherein: the file segment access information is sent to the host device based on a request to return the file, the file is associated with a first cost, and the request is configured to enable the host device to indicate that a second file is downloadable via a server for a second cost different than the first cost.

4. The method as in claim 1, wherein the sending of the file segment access information to the host device includes sending identity information to facilitate identification of the file, the storage device, or any combination thereof.

5. The method as in claim 1, further comprising temporarily prohibiting access to the file until a response is received from a server.

6. The method as in claim 5, wherein:
   if the file segment access information satisfies the return policy associated with the file, the response from the server includes one or more replacement files, and
   if the file segment access information does not satisfy the return policy, the response from the server includes a message that the file is unreplaceable due to excessive use of the file.

7. The method as in claim 1, wherein:
   the memory stores a file replacement criteria table that includes a replacement credit value associated with the file,
   the replacement credit value is based on a number of times each file segment of the plurality of file segments has been read, and one or more replacement files are selected based at least in part on the replacement credit value.

8. The method as in claim 1, wherein:
the memory stores a file replacement criteria table that indicates a first replacement credit value if a first percentage of file segments of the file have been read at least once,
the file replacement criteria table indicates a second replacement credit value if a second percentage of file segments of the file have been read at least once,
the first replacement credit value is less than the second replacement credit value, and
the first percentage is greater than the second percentage.

9. The method as in claim 1, wherein:
the memory stores a file replacement criteria table that is associated with the return policy for the file and that indicates a first replacement credit value based on the first file segment being read at least once,
the file replacement criteria table indicates a second replacement credit value based on the second file segment being read at least once,
the first replacement credit value is less than the second replacement credit value, and
the return policy indicates that the first file segment has a higher importance than the second file segment.

10. The method as in claim 1, wherein the file includes audio content, video content, or a combination thereof.

11. The method as in claim 1, wherein
the memory stores a file replacement criteria table that includes information correlating a file replacement criterion and a replacement credit value, and
the file replacement criterion includes a maximum credit.

12. The method as in claim 1, wherein sending the file segment access information to the host device includes encrypting identity information, the file segment access information, or any combination thereof.

13. The method as in claim 12, further comprising using the file segment access information to access file replacement policy information from a file replacement criteria table.

14. The method as in claim 13, wherein:
the file is stored in the memory, and further comprising, based on the file replacement criteria table, receiving one or more replacement files from the host device and replacing the file in the memory with the one or more replacement files, and
replacing the file includes disabling access to all but a particular portion of the file instead of deleting the file.

15. The method as in claim 14, further comprising decrypting the one or more replacement files.

16. A storage device comprising:
a memory; and
a memory controller coupled to the memory, the memory controller configured to:
  detect reading of a first file segment of a file that comprises a plurality of file segments stored in the memory, the plurality of file segments including at least the first file segment and a second file segment, each of the plurality of file segments associated with the file in a file access tracking table stored in the memory;
  in response to the reading of the first file segment, update an entry corresponding to the file in the file access tracking table, wherein the entry includes file segment access information indicating a number of times each of at least the first file segment and the second file segment has been read, the file segment access information indicating that the first file segment has been accessed more than one time; and
  send the file segment access information to a host device coupled to the storage device, wherein the file segment access information is configured to indicate replacement of the file with one or more replacement files in response to one or more of the file segment access information satisfying a return policy associated with the file, the file segment access information not changing during a time period associated with the file, and the file segment access information changing only within an allowed margin during the time period associated with the file.

17. The storage device as in claim 16, wherein the memory controller is further configured to receive, from a server via the host device, an identification of a second file.

18. The storage device as in claim 16, wherein:
the file segment access information includes encrypted identity information, encrypted file segment access information, or any combination thereof, and
the memory controller is further configured to send the identity information with the file segment access information to facilitate identification of the file, the storage device, or any combination thereof.

19. The storage device as in claim 16, wherein the memory controller is further configured to:
send the file segment access information to the host device based on a request to return the file; and
replace the file with the one or more replacement files if the file segment access information does not change, or changes only within an allowed margin, from a time the file segment access information is sent to the host device until a time the one or more replacement files are received.

20. The storage device as in claim 16, wherein the memory controller is further configured to temporarily prohibit access to the file from a time the memory controller sends the file segment access information to the host device until a response is received from a server.

21. The storage device as in claim 16, wherein: the memory controller is further configured to send the file segment access information to the host device based on a request to return the file, the file is associated with a first cost, and the request is configured to enable the host device to indicate that a second file is downloadable via a server for a second cost different than the first cost.

22. A method comprising:
receiving, at a server, segment access information associated with a first file that comprises a plurality of segments stored in a storage device coupled to a host device, the first file and a second file available for a first cost and a second cost, respectively, from the server, wherein the segment access information indicates how many times each segment of the first file stored in the storage device has been read;
receiving selection data from the host device regarding a selection of one or more replacement files; and
sending to the host device the one or more replacement files or an indication associated with the one or more replacement files, the one or more replacement files or the indication sent to the host device in response to one or more of the segment access information satisfying a return policy associated with the first file, the segment access information not changing during a time period associated with the first file, and the segment access information changing only within an allowed margin during the time period associated with the first file.

23. A server comprising:

a memory; and a processor coupled to the memory, the processor configured to:

receive segment access information associated with a first file that comprises a plurality of segments stored in a storage device coupled to a host device, the first file and a second file available for a first cost and a second cost, respectively, from the server, wherein the segment access information indicates how many times each segment of the first file stored in the storage device has been read;

receive selection data from the host device regarding a selection of one or more replacement files; and send to the host device the one or more replacement files or an indication associated with the one or more replacement files, the one or more replacement files or the indication sent to the host device in response to one or more of the segment access information satisfying a return policy associated with the first file, the segment access information not changing during a time period associated with the first file, and the segment access information changing only within an allowed margin during the time period associated with the first file.

24. A method comprising:

at a host device coupled to a storage device that stores a file comprising a plurality of segments, performing by the host device:

generating an interface that identifies the file and replacement files, the file downloadable via a server for a cost that differs from a second cost of a second file downloadable via the server, wherein at least one of the replacement files is available from the server in exchange for a return of the file;

receiving a selection of the file via the interface;

in response to the selection: receiving segment access information from an access tracking table stored at the storage device, the segment access information indicating how many times each segment of the file has been read;

sending the segment access information to the server; and receiving from the server one or more of the replacement files or an indication associated with the one or more of the replacement files, the one or more of the replacement files or the indication received in response to one or more of the segment access information satisfying a return policy associated with the file, the segment access information not changing during a time period associated with the file, and the segment access information changing only within an allowed margin during the time period associated with the file.

* * * * *